No. 653,744. Patented July 17, 1900.
W. M. JEWELL.
APPARATUS FOR PURIFYING WATER.
(Application filed May 25, 1899.)

(No Model.)

Witnesses
Julia M. Bristol
Helen N. Collin

Inventor
William M. Jewell,
By his Attorneys
Bond, Adams, Pickard & Jackson

UNITED STATES PATENT OFFICE.

WILLIAM M. JEWELL, OF CHICAGO, ILLINOIS.

APPARATUS FOR PURIFYING WATER.

SPECIFICATION forming part of Letters Patent No. 653,744, dated July 17, 1900.

Application filed May 25, 1899. Serial No. 718,206. (No model.)

*To all whom it may concern:*

Be it known that I, WILLIAM M. JEWELL, residing at Chicago, in the county of Cook and State of Illinois, have invented a certain new and Improved Apparatus for Effecting Coagulation in Liquids, of which the following is a specification, reference being had to the accompanying drawings.

My invention relates to the treatment of water and other liquids for the purpose of effecting coagulation of the impurities contained in them, and it has particularly to do with supplying the liquid with a coagulating reagent which acts to coagulate the impurities, so as to facilitate their separation from the liquid when it passes through a granular filter-bed.

It consists in certain improvements in apparatus for the purpose stated by which the coagulating reagent is effectually supplied to the liquid.

It also comprises means by which the heavier impurities may separate from the liquid and not be carried to the filter.

Figure 1:
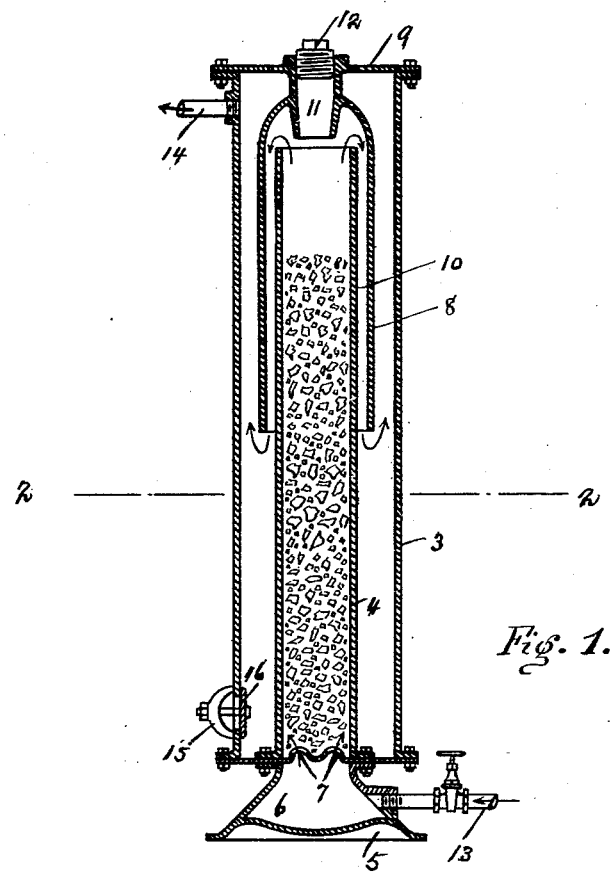
Figure 2:
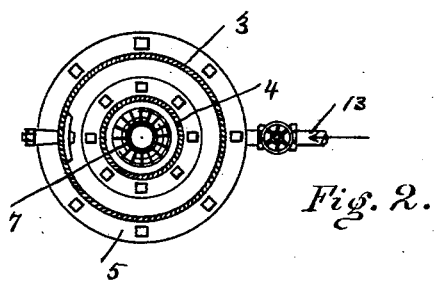

In the accompanying drawings, Figure 1 is a vertical section of an iron-holding tank, and Fig. 2 is a cross-section on line 2 2 of Fig. 1.

Referring to the drawings, 3 indicates an external tank, and 4 an internal tank arranged in the tank 3.

5 indicates a base which supports the tanks 3 4 and is provided with a chamber 6, as shown in Fig. 1.

The chamber 6 communicates with the interior of the tank 4 by passages 7, which are similar to the usual passages in the nozzles of filter-tanks. The tank 4, as illustrated in Fig. 1, is open at the top and is provided with a hood 8, which is secured to the top 9 of the tank 3 and extends down over the upper end of tank 4, as shown, a passage 10 being provided between said hood and the tank 4.

11 indicates a passage in the cap 9 of the tank 3, which is closed by a plug 12 or other suitable device.

13 indicates an inlet-pipe for water, which communicates with the chamber 6 below the iron-tank 4.

14 indicates an outlet-pipe for water, which communicates with the upper part of tank 3.

15 indicates a hand-hole closed by a suitable plate 16, the said hand-hole being located near the bottom of tank 3.

The iron-tank 4 is partly filled with a quantity of iron ground to about the size of sand, the iron being introduced through the passage 11. Water is then admitted through pipe 13 to the chamber 6 and rises through the bed of iron, overflowing the upper edges of tank 4, thence passing down between the tank 4 and the hood 8 into the tank 3, in which it rises until it flows out through pipe 14. As the water flows upward through the iron of the tank 4 the bed of iron swells, rising in the tank. The particles of iron are thus separated and fully subjected to the action of the water, as well as to the corroding action caused by the ebullition of the water in the tank. The iron is thus rapidly dissolved and continually carried off by the flowing water. By providing the hood 8 over the tank 4 the water passing from the tank 4 is directed downward toward the bottom of the tank 3, and any heavy impurities carried by it are thus given an opportunity to settle, so that they are retained in the tank 3 and do not pass out through pipe 14 to the filter. They may be removed from the tank by removing the hand-hole cap 16.

The apparatus illustrated in the drawings is intended more especially for use in a system employing pressure-filters, but it may also be used for gravity-filters. In the latter instance, however, it is not necessary to close the top of the tank 3.

Instead of metallic iron various metallic compounds adapted to be acted upon by the liquid to form solutions capable of precipitation in flocculent form may be employed—such, for example, as bauxite. It should be understood, further, that the entire body of water to be purified may be caused to flow through the bed of iron or other substance, or, if desired, a part only of the water may be so passed through such bed, in the latter case the water containing the coagulating reagent being afterward conducted into the main body of water, after which the whole passes through a filter, which may be either of the pressure or gravity type.

That which I claim as my invention, and desire to secure by Letters Patent, is—

1. The combination of an internal tank, a bed of comminuted iron therein, means for introducing water into said internal tank below said bed, an external tank inclosing said internal tank, said internal tank being arranged to discharge the water passing through said bed into said external tank, and an outlet from said external tank near the top thereof, substantially as described.

2. In an apparatus for supplying a coagulating reagent to liquids, the combination of a tank open at the top, and a bed of comminuted iron therein, means for introducing water into said tank below said bed, an external tank inclosing said iron-holding tank, an outlet from said external tank near the top, and a hood extending down over the top of said iron-holding tank, substantially as described.

WILLIAM M. JEWELL.

Witnesses:
JOHN L. JACKSON,
ALBERT H. ADAMS.